(12) United States Patent
Yang

(10) Patent No.: US 7,438,025 B2
(45) Date of Patent: Oct. 21, 2008

(54) ULTRA-EXPANSION FOUR-STROKE INTERNAL COMBUSTION ENGINE

(76) Inventor: Zengli Yang, Postbox No. 55, Xiluyuan liangxiang Region, Fangshan District, Beijing (CN) 102487

(*) Notice: Subject to any disclaimer, the term of this patent is extended or adjusted under 35 U.S.C. 154(b) by 26 days.

(21) Appl. No.: 11/597,519

(22) PCT Filed: May 20, 2005

(86) PCT No.: PCT/CN2005/000699

§ 371 (c)(1),
(2), (4) Date: Nov. 27, 2006

(87) PCT Pub. No.: WO2005/116417

PCT Pub. Date: Dec. 8, 2005

(65) Prior Publication Data

US 2007/0227471 A1    Oct. 4, 2007

(30) Foreign Application Priority Data

May 26, 2004    (CN)    ................ 2004 1 0042858

(51) Int. Cl.
*F02B 1/12*    (2006.01)
*F02D 15/04*    (2006.01)
(52) U.S. Cl. .................. 123/27 R; 123/48 A; 123/78 A
(58) Field of Classification Search ............... 123/27 R, 123/27 A, 299–300, 90.15, 48 A, 48 AA, 123/48 D, 78 A, 78 AA, 78 D
See application file for complete search history.

(56) References Cited

U.S. PATENT DOCUMENTS 5,265,562 A * 11/1993 Kruse ................. 123/27 R (Continued)

FOREIGN PATENT DOCUMENTS

CN    1099100 A    2/1995

(Continued)

OTHER PUBLICATIONS

International Search Report of PCT/CN2005/000699, mailed Sep. 1, 2005.

*Primary Examiner*—Hai H Huynh
(74) *Attorney, Agent, or Firm*—Nixon & Vanderhye P.C.

(57) ABSTRACT

An ultra-expansion four-stroke internal combustion engine, includes a cylinder and a piston, wherein the compression degree of the admission space that satisfies the power requirement is maintained at 1.8-5 Mpa at the end of compression stroke to form the condition of increasing combustion temperature and pressure. According to an ultra expansion ratio that can be achieved by the effective working pressure, the working volume of cylinder is designed to be larger than the admission space, so that the heat energy remained after constant volume expansion working of the combustion gas may be exploited for further expanding under adiabatic condition to form the ultra-expansion working condition. Several cooling water jackets are arranged on the combustion chamber and the upper part of the cylinder, while no cooling water jacket is equipped at the lower part of the cylinder and a heat-insulating structure is applied thereto, thereby avoiding the heat loss in the process of the ultra-expansion working to improve the effect of ultra-expansion working. The diameter of the intake valve is reduced and the diameter of the exhaust valve is increased to decrease the exhaust advance angle and enhance the effect of ultra-expansion. The invention can increase the heat efficiency significantly, reduce the fuel consumption and/or reduce the environment contamination.

9 Claims, 3 Drawing Sheets

U.S. PATENT DOCUMENTS

| | | | | |
|---|---|---|---|---|
| 6,223,846 B1 * | 5/2001 | Schechter | ............ | 180/165 |
| 6,405,704 B2 * | 6/2002 | Kruse | ............ | 123/295 |
| 6,848,416 B1 * | 2/2005 | Pien | ............ | 123/305 |
| 7,114,485 B2 * | 10/2006 | Pien | ............ | 123/305 |
| 7,231,998 B1 * | 6/2007 | Schechter | ............ | 180/165 |

FOREIGN PATENT DOCUMENTS

| | | |
|---|---|---|
| CN | 1368595 A | 9/2002 |
| CN | 1388307 A | 1/2003 |
| CN | 1417463 A | 5/2003 |
| FR | 2265981 A1 | 10/1975 |

* cited by examiner

ULTRA-EXPANSION FOUR-STROKE INTERNAL COMBUSTION ENGINE

This application is the U.S. national phase of international application PCT/CN2005/000699, filed 20 May 2005, which designated the U.S. and claimed priority of CN 200410042858.0, filed 26 May 2004, the entire contents of each of which are hereby incorporated by reference.

TECHNICAL FIELD

The invention relates to an internal combustion engine, particularly to an ultra-expansion four-stroke internal combustion engine which operates in a mode of working under ultra expansion and exhausting at low temperature.

BACKGROUND ART

Through more than 100 years' development and modification, the mechanical efficiency of internal combustion engine almost reaches its extremity. With the aid of electronic technology in recent years, the combustion efficiency is increased, while the work efficiency is difficult to increase due to the limit of the inherent working mode, the reasons include:

1. The internal combustion engines operate in a constant volume working mode since they are invented, that is to say, in a theory cycle of the existing internal combustion engines, the four strokes of intake, compression, combustion, exhaust are isometric (equal-stroke); the combustion working stroke of the piston is equal to the intake stroke (the working volume of the cylinder is equal to the intake volume). Therefore, at the end of combustion working, the temperature and pressure of the combustion gas in the cylinder are still high, and the exhaust gas is discharged in flame form. The heat loss caused by this constant volume expansion working and high temperature exhausting mode accounts for approximately 35% of the total heat. This is inevitable for the existing internal combustion engines, because the structure of the existing internal combustion engine determines that the working volume of the cylinder is equal to the intake volume (Since the exhaust advance angle is 50°-60°, the limited working stroke is further reduced, and actually the working stroke is shorter than the intake stroke). The high temperature exhausting phenomenon is caused by the fact that the piston can not do work continuously after reaching the bottom dead point, and the exhaust gas which still contains massive heat energy only can be discharged as waste gas.

2. In order to avoid the overheating phenomenon of internal combustion engine appearing, it is necessary to cool the cylinder body by forced circulation cooling, and the heat carried off by the cooling system accounts for approximately 30% of the total heat. According to operation principle of high temperature exhausting, the internal combustion engine operating in the constant volume working mode can not improve its heat efficiency even though a heat preservation and heat insulation means is applied to increase the operating temperature and as a result the exhaust temperature is increased, because there is no essential modification in the heat energy conversion mode, so that the heat energy which is not carried off by the cooling system will be carried off by the exhaust system.

3. The existing internal combustion engines include spark-ignition internal combustion engines and compression-ignition internal combustion engines, and the compression ratio is used to indicate the compression degree of gas when the piston reaches the compression end. The compression ratio is quite low for the early internal combustion engines, it is 5-8:1 in the spark-ignition internal combustion engine, and 10-18:1 in the compression-ignition internal combustion engine, so the heat efficiency is low. In recent years, the compression ratio is increased to 8-11:1 for the spark-ignition internal combustion engines, corresponding to a compression degree of about 0.7-1 Mpa, and to 16-22:1 for the compression-ignition internal combustion engines, corresponding to a compression degree of about 1.5-2 Mpa, so the heat efficiency is improved remarkably. Obviously the magnitude of the compression ratio is in close correlation with the heat efficiency of the internal combustion engines, the reason is that a higher compression ratio can produce a higher combustion temperature and pressure, and the average working pressure on the piston is increased, therefore the heat efficiency is increased. However, the compression ratio of the existing internal combustion engine is difficult to be further increased due to the restriction of the detonation phenomenon and the mechanical structural strength of the internal combustion engine.

4. The theoretical compression ratio of the existing internal combustion engine is fixed. When running in an operating condition of low rotational speed and heavy load (namely with the maximum air intake quantity), the internal combustion engine may reach its designed compression degree. While running in an operating condition of high rotational speed and light load (namely with a small air intake quantity), the actual compression degree reduces at the top dead point even though the theoretical compression ratio is not changed, thereby the heat efficiency reduces. Therefore the heat efficiency is quite different in different operating conditions. This is the main reason why the heat efficiency of substance-controlling internal combustion engine is higher than that of the quantity-controlling internal combustion engine.

5. In the existing internal combustion engine, the ignition or oil injection time is set about 20°-30° before the top dead point, and the mixed gases enter the main combustion period after a physical and chemical reaction process. The highest combustion temperature and pressure occur at about 6° behind the top dead point by controlling the ignition time. In fact the produced temperature and pressure in this range are only related to the concept of strength in spite of how high they are. When passing through the vicinity of top dead point, the pressure is the highest but the speed of piston is almost "zero", therefore it does a little work. Furthermore, it is inevitable that the combustion gas leaks out through the piston ring. In this stage, heat quantity is concentrated, the temperature is the highest, and the heat loss also is the most. So the leaked "substance" at this time is not neglectable. For example, when treading the bicycle, make an effort it is of no use no matter how you put forth your strength on the peak of the footboard (corresponding to the top dead point), and only after turning to a certain angle, it is able to produce a force moment for doing work. In view of this fact, the ignition time of the internal combustion engine should be postponed to let the highest combustion temperature and pressure occur about 15° behind the top dead point.

The existing internal combustion engine is ignited or injected oil in advance in all operating conditions, so that a part of fuel begins to burn before the top dead point, and heat energy is released to elevate the temperature and the pressure rapidly. Thereby the compression negative work is increased, and it is likely to cause the detonation phenomenon which makes the operation to be wild. The basic reason that the existing internal combustion engine does not postpone the ignition and oil injection is that, only at the top dead point the compression degree and the constant volume degree are the highest, and the combustion temperature and the pressure are the highest. It is the best ignition time but not the best working time, the best working time is 15° behind the top dead point, so the ignition time should be postponed. But the postponement of the ignition may lead to decrease of the compression degree and the constant volume level, and the unburned gas expands as the piston runs down after the piston passes through the top dead point, thereby the compression degree is reduced and the heat efficiency is reduced.

In view of the above phenomenon, many technical solutions appeared one after another, such as Chinese patent CN1417463A, CN1388307A and so on, all of them proposed that based on the original internal combustion engines, modification is made without changing the original structure, the working stroke of the piston is increased by reducing the intake quantity or increasing the working volume of the cylinder, so as to reach the effect of saving fuel, the method of reducing intake quantity includes: (1) perform with throttling of the throttle. (2) perform with closing intake valve in advance in the inspiration process. (3) perform by opening the exhaust valve at the beginning of the compression stroke and closing the exhaust valve after a part of the air exhausted, and so on.

These solutions may save fuel theoretically, for the reason that after the intake quantity of the cylinder is reduced, that is to say the working substances in the cylinder is reduced, at the beginning stage of working (i.e. constant volume working stage) the original combustion temperature and pressure is maintained, at the latter stage of working (desired to obtain gain stage, theoretically there is 30%-35% heat energy in the combustion gas in this stage) there is massive heat energy in the gas of the cylinder, the question is the grade of the heat energy is very low, the work actually can be obtained is very little (only if adopted means to promote its grade). The key point is that the total heat is also reduced after the working substance entering the cylinder is reduced, and the area of dissipation of the cylinder is increased, the heat dissipating capacity is relatively increased, though there is pressure in the gas in the cylinder that cooled by the water jacket but it can not efficiently work, the work obtained by the theoretically increased stroke counteracts with the mechanical loss, especially in case of high rotational speed and high efficiency operating condition then the negative work exceeds positive work and obtains more less than gains. Therefore, it is inadequate to merely depending on reducing intake quantity or increasing the stroke of the piston, thus the improved internal combustion engine is inevitably led to under power and lose the practical value.

DISCLOSURE OF THE INVENTION

The object of the invention is to exploit low grade combustion gas which contains massive heat energy for further expansion working, that is to say ultra-expansion working. Only forming the ultra-expansion working condition is not enough to perform ultra-expansion working, it must improve the grade of the combustion gas which contains massive heat energy, and establish the thermodynamic cycle mode that consistent with the requirement of the ultra-expansion working, the cooling loss and exhaust loss in the heating energy conversion process can be reduced, thus the heat efficiency is increased.

The invention provides a brand-new designed four stroke internal combustion engine which operates in a mode of working under ultra-expansion and exhausting at low temperature, compression degree is greatly increased to produce higher combustion temperature and pressure, and according to an ultra-expansion ratio that can be achieved by the effective working pressure, the working volume of cylinder is designed to be larger than the admission space V2, the heat energy remained after constant volume working of the combustion gas may be fully exploited for further working under adiabatic condition. The invention is the extension and development of the working principle of the existing four stroke internal combustion engine, the means to improve the heat efficiency includes: 1. increase compression degree, postpone the ignition and oil injection, let the highest combustion temperature and the pressure occur 10-20° behind the top dead point, take about 15° as the best. 2. further working under adiabatic condition by exploiting the heat energy in the exhaust gas, that is to say ultra-expansion working. 3. a few cooling water jacket is mounted on the combustion chamber and the upper part of the cylinder, while the lower part of the cylinder is not provided with a cooling water jacket, but rather a heat-insulating means, to reduce the heat loss in the process of the expansion working and increase the ultra-expansion working effect. 4. reduce the diameter of the intake valve, increase the diameter of the exhaust valve in limited space to reduce the exhaust advance angle (all the diameter of the intake valve is larger than the diameter of the exhaust valve of the existing internal combustion engine), to increase the stroke of ultra-expansion working.

The object of the invention is achieved according to the following technical solution.

The ultra-expansion four-stroke internal combustion engine of the invention, including a cylinder and a piston, wherein: the compression degree of the admission space that satisfies the power requirement is maintained at 1.8-5 Mpa at the end of compression stroke to form the condition of increasing combustion temperature and pressure; According to the ultra-expansion ratio that can be achieved by effective working pressure, the working volume of cylinder is designed to be larger than the admission space, the heat energy remained after constant volume expansion working of the combustion gas may be exploited for further expanding under adiabatic condition to form the ultra-expansion working condition.

It further comprises a variable compression degree/constant volume level compensation means for keeping the constant volume level and the compression degree not fall when the ignition is postponed, so that the highest combustion temperature and pressure occur in the range of 10°-20° behind the top dead point (S). The said variable compression degree/constant volume level compensation means includes compensating piston, the said compensating piston can move up and down in the compensated chamber which is communicated with the combustion chamber.

A cooling water jacket is mounted on the combustion chamber and the upper part of the cylinder, while the lower part of the cylinder is not provided with a cooling water jacket, but rather a heat-insulating means. The diameter of the exhaust valve is larger than the diameter of the intake valve.

In the present invention, the admission space V2 that satisfies the power requirement is maintained at 1.8-5 Mpa at the end of compression stroke to form the condition of increasing combustion temperature and the pressure, the ignition time should be postponed to let the highest combustion temperature and pressure occur 10°-20° behind the top dead point; According to the ultra-expansion ratio that can be achieved by effective working pressure, the working volume of the cylinder V is designed, the heat energy remained after constant volume expansion working of the combustion gas may be exploited for further expanding under adiabatic condition to form the ultra-expansion working condition.

The said intake volume V2 must be the admission space that satisfies the power requirement, the maximum admission space of the circulation cross-sectional area of the manifold, throttle valve and intake valve of the invention is achieved by V2.

The said increasing the compression degree is one times higher than the compression degree of the existing internal combustion engine, which is the important condition to achieve the ultra-expansion working of the invention.

The said variable compression degree/constant volume level compensating means is to guarantee the postponement of the ignition and do not decrease the constant volume level, let the highest combustion temperature and pressure occur 10°-20° behind the top dead point, for example about 15° the best working time, fundamentally solve the contradiction between the increasing the compression degree and the initiation of detonation phenomenon; contradiction between the postponement of the ignition and decrease of the constant volume level.

The said increasing the diameter of exhaust valve, decreasing the diameter of the intake valve, decreasing exhaust advance angle and increasing working stroke, is the ingredient of the ultra-expansion working of the invention.

A few cooling water jacket is mounted on the combustion chamber and the upper part of the cylinder, while the lower part of the cylinder is not provide with a cooling water jacket, but rater a heat-insulating means of the ultra-expansion four stroke internal combustion engine, to avoid the heat loss in the process of the ultra-expansion working, it is the technical means to increase the effect of the ultra-expansion working.

The ultra-expansion four-stroke internal combustion engines include spark-ignition internal combustion engines and compression-ignition internal combustion engines. Its theoretical operating cycle is four-stroke of intake, compression, expansion ultra-expansion working.

If the said internal combustion engine is a spark-ignition internal combustion engine, and the compression degree of the gas is 1.8-3 Mpa when the said piston reaches the top dead point.

The closing angle of the intake valve is 10°-20° before the bottom dead point in the 0°-360° cycle of crank shaft; and the opening angle of its exhaust valve is 15°-25° before the bottom dead point in 360°-720° cycle of crank shaft.

If the said internal combustion engine is compression-ignition internal combustion engine, and the compression degree of gas is 3-5 Mpa when the said piston reaches to the top dead point.

The closing angle of its intake valve is 10°-20° before the bottom dead point in the 0°-360° cycle of crank shaft; and the opening angle of its exhaust valve is 15°-25° before the bottom dead point in 360°-720° cycle of crank shaft.

The said admission space that satisfies the power requirement is V2, the compression degree is 1.8-5 Mpa, the temperature and pressure which is higher than that of the existing internal combustion engine occur 10°-20° behind the top dead point after the ignition combustion. the constant volume expansion working of the admission space is completed when the combustion gas pushes the piston to V2, the temperature and pressure of the gas in the cylinder is equal to the temperature and pressure of the exhaust when the existing internal combustion engine completed working, therefore the stroke of the piston is the ultra-expansion working stoke of exploiting low degree heat energy under heat-insulating condition. For example, the working volume of the cylinder is two times of the constant volume admission space, when the piston moves down to one half of the working volume after ignition combustion, the temperature of the gas in the cylinder is the temperature when the admission space completes the constant volume expansion working, and the other one half of the stroke of the piston is one time of the ultra-expansion working stroke under heat insulating condition; If the working volume of the cylinder is 3 times of the constant admission space, 2 times ultra-expansion working stroke can be obtained. Therefore, the higher the compression degree of the ultra-expansion four-stroke internal combustion engine, the longer the ultra-expansion working stroke, the better the heat preservation and heat insulation means, the lower the exhaust temperature and the higher gain can be obtained.

The design of the ultra-expansion four-stroke internal combustion engine should be based on the admission space $V_2$ that satisfies the power requirement and ultra-expansion ratio, the design of the working volume of the cylinder such as the design of 2 times of the ultra-expansion then $V=V_2 \times 3$.

The invention should design cylinder, piston, cooling water jacket, gas distribution system, combustion chamber, valve system, intake valve, exhaust valve, throttle of the electrical injection part, intake manifold, exhaust manifold, auto-ignition or oil injection postponing/advancing means, variable compression degree/constant volume level compensating means according to the ultra-expansion working principle to satisfy the technical requirement of the ultra-expansion working.

The advantage of the invention is:

1. The compression degree is greatly increased, higher combustion temperature and pressure may be obtained. Performing ultra expansion working and low temperature exhausting under the heat insulating condition is the substantive increase of work nature; The way to increase the heat efficiency is to exploit the heat energy remained after constant volume working of the combustion gas for further working and the higher gain may be obtained; Increasing the heat energy not only mean to decrease the fuel consumption in the unit work, but also mean to decrease the exhaust in the unit work.

2. Compression degree is greatly increased, the output power and efficiency are increased; The invention is to depend ECU (not shown in the drawing) to real time control ignition or oil injection advancing/postponing to avoid causing detonation phenomenon, when at operating condition of low rotational speed and heavy load, the ignition time will be postponed to behind the top dead point. The invention is to depend postponement of ignition or oil injection to avoid causing detonation phenomenon, and depend constant volume compensating means to compensate the constant volume degree after the postponement of ignition, let the highest combustion temperature and pressure occur 10°-20° behind the top dead point, therefore it will not affect the structural strength and make the operation to be wild.

3. A few of cooling water jacket are mounted on the combustion chamber and the upper part of the cylinder while the lower part of the cylinder is not provided with a cooling water jacket, but rather a heat insulating means to avoid the heat loss in the process of the ultra-expansion working of the combustion gas, increase the effect of the ultra-expansion working and establish a thermodynamic cycle system which conform to the ultra-expansion working principle.

4. The diameter of the exhaust valve may be increased and the diameter of the intake valve may be decreased in the limited space of the diameter of the cylinder, the object is to decrease the advance angle of the exhaust to below 25°, and increase the stroke of the ultra-expansion working. (the advance angle of the exhaust of the existing internal combustion engine is 50°-60°, the heat carried off by the exhaust in advance accounts for 40% of the total exhaust loss.)

In summary, the method of the invention may perform the ultra expansion work, increase compression degree, perform postponement of the ignition, take the heat insulating means, reduce the heat loss in expansion process, decrease advance angle of the exhaust, thus to increase heat efficiency, save the fuel and reduce the discharge.

Figure 2:
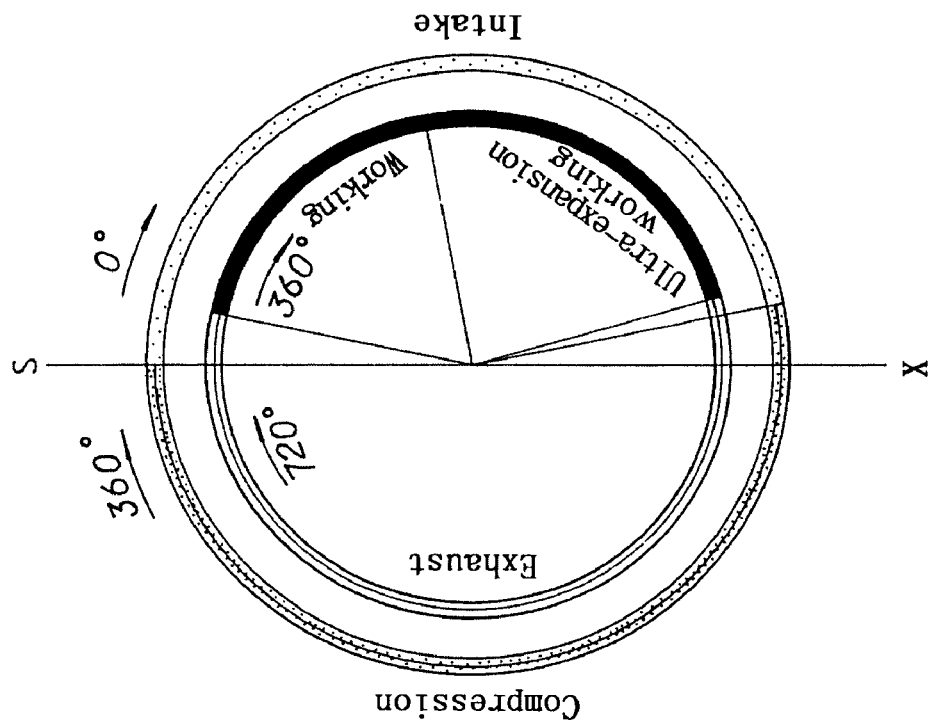
FIG. 2 is the duty circle of the ultra-expansion four-stroke internal combustion engine of the invention.

Description of the symbol in the diagram 1 cylinder  2 piston  3 intake valve  4 exhaust valve
5 combustion chamber  6 cooling water jacket
7 heat-insulating means  8 compensation chamber
9 compensation piston  10 return spring  11 compensation cam
V the working volume of the cyclinder  $V_2$ admission space
$V_1$ combustion chamber volume  S top dead point
X bottom dead point
α opening angle of the intake valve 3 (advance angle of intake)
$α_1$ closing angle of the intake valve 3
β opening angle of the exhaust valve 4 (advance angle of exhaust)
$β_1$ closing angle of the exhaust valve 4
δ1 the angle which the compensation piston begins to move upwards
δ2 the angle which the compensation piston begins to move downwards

MODE FOR INVENTION

The ultra-expansion four-stroke internal combustion engine will be described as an example.

EXAMPLE 1

Modify the Existing Internal Combustion Engine by the Method of Reducing the Intake Quantity In the example, intake phase was changed by the method of changing intake cam form line, phase angle, to close the intake valve in advance 50° before the bottom dead point, it could decrease 35% of the intake quantity. It increased 35% of the work stroke in theory by relatively decreasing 35% of the volume of the combustion chamber and maintaining the original compression degree. The exhaust phase, the diameter of the intake valve, the diameter of the exhaust valve, ignition time and cooling water jacket maintained the original condition, the invention is spark-ignition internal combustion engine.

The internal combustion engine was loaded into a car and hundred kilometers constant speed oil consumption experiment was performed. Under the same condition, the temperature of the cooling water is 10° C. lower than that of cooling water before being modified. Hundred kilometers constant speed (60 km/h) oil consumption decreased about 28%, the effect of saving oil was obvious.

Bench test was performed on the internal combustion engine, the condition of the experiment was: oil consumption meter, the rotational speed meter, dynamometer, compared with that of before being modified, the result of the bench test showed: the power reduced 32%, oil consumption ratio (kw·h) g curve: it decreased about 15% at low speed, it was almost the same at middle speed, it increased 8% at high speed.

According to the result of the constant speed oil consumption experiment and the bench test of the example, the reason why the constant speed oil consumption decrease of 28% was the reduction of the power, which belonged to power reduction application nature, although the test condition was the same constant speed, the power reserve was high before modification, and the power decreased after modification, the power reserve was low, therefore the oil consumption reduced. And the reason why the temperature of water was decreased was after the combustion working substances reduced, the total heat was reduced, and the area of the heat emission ratio was increased. The internal combustion engine modified by the method of reducing intake quantity in the example had obvious oil saving effect at low rotational speed, and the mechanical loss increased at high rotational speed, the mean effective pressure acting on the piston was reduced, at the later stage of working, there was pressure in the cylinder, but it was insufficient to push the piston to effectively work, and oil saving effect as desired can not achieved In fact, the operating nature of the example was to decrease the quantitative of the intake quantity of the original internal combustion engine, increase the quantitative compression ratio, maintain the compression degree of the intake quantity, corresponding to work at medium small power before modification (the intake amount was decreased), and relatively increased compression ratio, therefore the heat efficiency was improved at the medium and small power.

Figure 1:
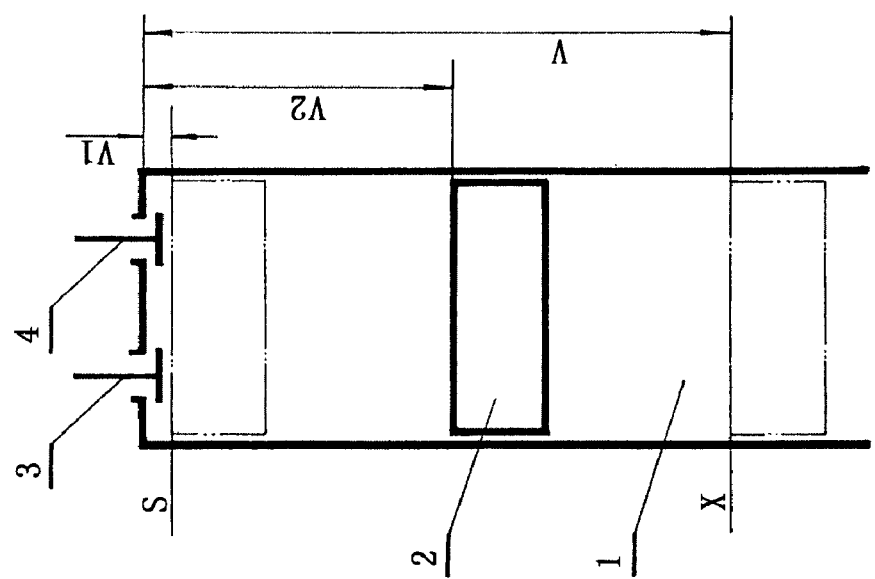
FIG. 1 is the schematic diagram of the ultra-expansion four-stroke internal combustion engine of the invention.

FIG. 1 is the schematic diagram of the ultra-expansion four-stroke internal combustion engine of the invention, including a cylinder 1 and a piston 2, wherein: the compression degree of the admission space V2 that satisfies the power requirement is maintained at 1.8-5 Mpa at the end of compression stroke to form the condition of increasing combustion temperature and pressure; According to an ultra-expansion ratio that can be achieved by effective working pressure, the working volume V of the cylinder is designed to be larger than the admission space (V2), the heat energy remained after constant volume expansion working of the combustion gas may be exploited for further expanding under the adiabatic condition to form the ultra-expansion work condition under only ultra-expansion temperature drop and no cooling temperature drop.

Referring to FIG. 2, FIG. 2 is the duty circle of the ultra-expansion four-stroke internal combustion engine of the invention. The duty circle is four strokes of intake, compression, combustion working (including constant volume expansion working and ultra expansion working), exhaust, a theory duty circle in each 0°-720° of the crank shaft is completed.

Intake and compression stroke is completed in the 0°-360° of the crank shaft.

Intake stroke: The intake stroke is the stroke that the piston 2 moves from the top dead point S to bottom dead point X, Working volume V of the cylinder is designed to be 3 times of the admission space $V_2$ (namely two times of ultra-expansion).

Figure 3:
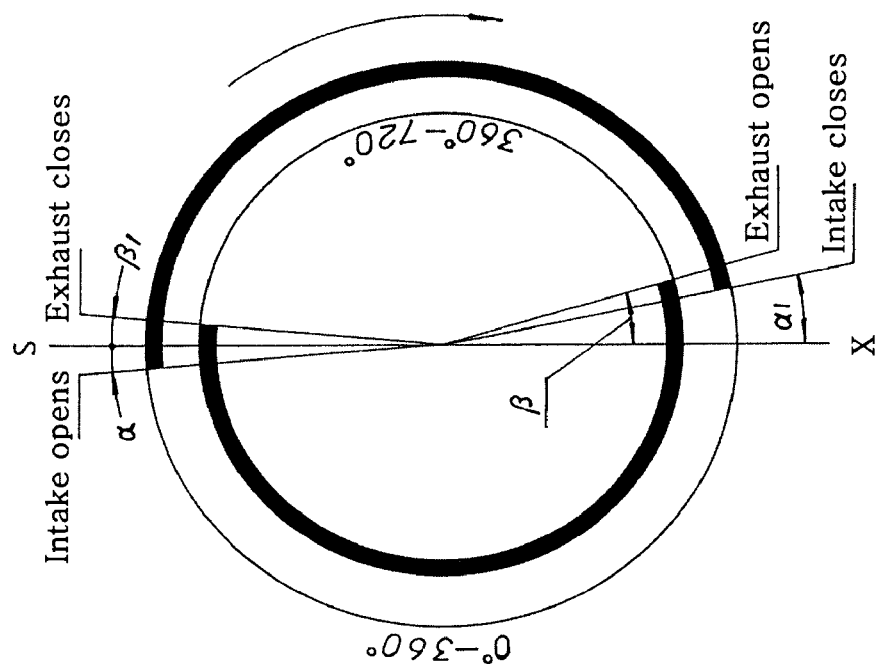
FIG. 3 is the valve timing schematic diagram of the ultra-expansion four-stroke internal combustion engine of the invention.

Referring to FIG. 3, the admission space $V_2$ means that the volume that intake volume is occupied in the cylinder under the atmospheric pressure. The maximum intake volume of the circulating sectional area of the designed intake manifold, throttle valve and intake valve is the admission space $V_2$ that satisfies the power requirement, the intake stroke that reaches the admission space $V_2$ ends at the closing angle $\alpha_1=10°$-$20°$ before the bottom dead point. The object is to reach the vicinity of the bottom dead point X (nearly 180°) when the intake is completed, for example, to maintain the four cylinders uniformly take in air in 720° cycle of the crank shaft (for example closing of the intake valve in advance may produce a short negative pressure impulse and result the instability of the intake), facilitate to grantee the stability of the intake flow, accuracy of the measurement and the control precision of the air fuel ratio.

Compression stroke: The compression stroke is the stroke that the piston 2 moves from bottom dead point X to top dead point S. The invention increases the compression degree when the piston reaches the end point, the designed compression degree 1.8-5 Mpa is reached at the top dead point S, which is much higher than that of the existing internal combustion engine.

Combustion work and compression stroke is completed in 360°-720° of the crank shaft.

Combustion working stroke: Combustion working stroke is the stroke that the piston 2 moves from top dead point S to the bottom dead point X. The best ignition or oil injection time can be guaranteed depending on the auto-ignition or oil injection advancing/postponing means, to let the highest combustion temperature and the pressure occur about 15° behind the top dead point. The combustion gas pushes piston 2 to work, the piston 2 completes its constant volume expansion working stroke when moves down to the admission space V2; The stroke that from V2 to the opening angle β before the bottom dead point X is the ultra expansion working stroke under the adiabatic condition.

Exhaust stroke: The exhaust stroke is the stroke that the piston moves from bottom dead point X to top dead point S. The advance angle of exhaust β is 15°-25° before bottom dead point X (the advance angle of exhausts β=50°-60° of the existing internal combustion engine), the piston 2 moves from bottom dead point X to top dead point S, to perform exhaust by force.

FIG. 3 is the valve timing schematic diagram of the ultra-expansion four-stroke internal combustion engine of the invention. The air fuel ratio of the internal combustion engine of the invention is track controlled by electrically controlled fuel oil injection system, the maximum intake flow of the circulating sectional area of the intake manifold and intake valve is admission space $V_2$ that satisfies the power requirement, the opening angle α of the intake valve 2 and the closing angle $β_1$ of the exhaust 4 is overlapped to sweep the gas; The closing angle $α_1$ of intake valve 3 is 10°-20° before the bottom dead point in 0°-360° cycle of the crank shaft; The opening angle β of exhaust valve 4 is 15°-25° before the bottom dead point in 360°-720° cycle of the crank shaft, to increase the ultra-expansion working stroke.

Figure 4:
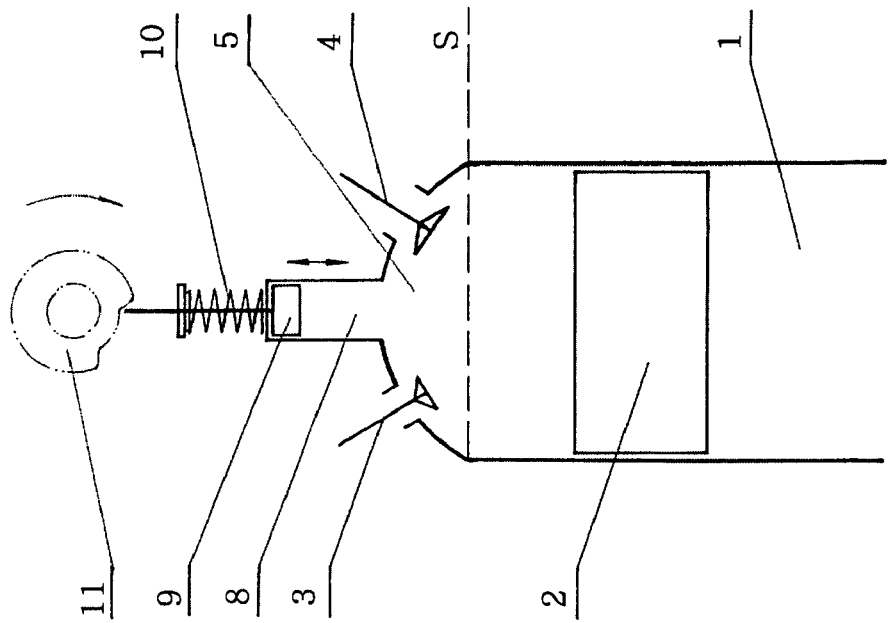
FIG. 4 is schematic diagram of the variable compression degree/constant volume level compensating means of the ultra-expansion four-stroke internal combustion engine of the invention.

FIG. 4 is schematic diagram of the variable compression degree/constant volume level compensating means of the ultra-expansion four-stroke internal combustion engine of the invention. A compensation piston 9 which can move up and down is in the combustion chamber, the space that the compensation piston 9 moves is the compensation chamber 8, the volume of the compensation chamber 8 belongs to a part of the volume V1 of the combustion chamber. The volume of the compensation chamber is about ⅕ of the volume of the combustion chamber (including the volume of the compensation chamber). The compensation piston 9 is driven by compensation cam 11 and return spring 10 and can change lift range (use "variable valve lifting, variable valve timing" of the prior art, no longer gives unnecessary detail), and also can be driven by solenoid valve, hydraulic pressure, air operated means and the like. The lowest position of compensation piston 9 is even with the combustion chamber 5, the smallest volume of the combustion chamber can be formed when stopping at this position, and the compression degree may be increased; Stopping at the highest position is the biggest volume of the combustion chamber 5 including compensation chamber 8, and is the normal working operating condition; Driven by the compensation cam 11 and return spring 10, the compensation piston 9 moves between the highest position and the lowest position to carry out the constant volume degree compensation.

The function of the variable compression degree/constant volume level compensating means is:

When compensation piston 9 stopping at the highest position (graphic position) is middle rotational speed and middle load, the compression degree need not to be increased and the normal operating condition of the constant volume degree need not to be compensated.

When the compensation piston 9 stopping at the lowest position it is variable compression degree function, as mentioned above, the theoretical compression ratio of the internal combustion engine is fixed, when running in an operating condition of high rotational speed, light load or idle speed, the intake is little, the compression degree is obviously below the designed compression degree at the top dead point even though the compression ratio is not changed, therefore the heat efficiency is decreased. Under this operating condition the firing time is before the top dead point, the constant volume degree is not reduced, and compression degree should be increased. The compensation piston 9 stops at the position that increase the compression degree (the lowest position, that is to say be even to that of the combustion chamber), because the volume of the compensation chamber belongs to a part of the volume of the combustion chamber, therefore the volume of the combustion chamber becomes small, and the compression degree is increased.

When load is gradually increased and intake is increased, to avoid causing detonation phenomenon because of greatly increase of the compression degree, the ignition time is gradually postponed to reduce the constant volume degree, at this time the compensation piston 9 begins moving up and down from the stop state, its lift range is increased along the increase of the postponing angle of firing, at this time the variable compression function becomes constant volume compensation function.

The moving up and down of the compensation piston 9 is constant volume degree compensation function. As described above, when running in an operating condition of low rotational speed and heavy load, the internal combustion engine may reach its designed compression degree at the maximum intake quantity, at this operating condition the ignition or oil injection time can be postponed to the point behind the top dead point. When the piston 2 begins moving down, unburned mixed gas expands along with the moving down of the piston 2 to decrease the compression degree. The compensation function of the constant volume degree is that when the piston 2 begins moving down, the compensation piston 9 moves down along with the piston 2, to push out the mixed gas in the compensation chamber 8, to compensate the moving down volume of the compensation piston 2, It is determined the height of the variable lift range of compensation cam 11, that is to say the required compensation volume (the compensation rate should be less than 100%, to make the compensation piston 9 not do compression work, to reduce the load of the compensation piston) according to the size of the postponing angle of the current ignition, that is to say the volume that the piston moving down by ECU (not shown in the figure), the volume that the piston 2 moving down should be supplemented by the volume of the compensation chamber 8, to make the compression degree of the original compression to the top dead point when postponing the ignition not decrease when surpassing the top dead point S, and achieve the compensation effect of the constant volume, to let the highest combustion temperature and pressure occur behind about 15° of the top dead point S.

In practical application, when the firing time gradually postpones to carry out constant volume compensation, the moving lift range of the compensation piston 9 is gradually increased from "zero", in the compression stroke of the piston 2, the compensation piston 9 moves upwards, part of the gas moves upwards into compensation chamber 8 along with compensation piston 9. The lift range of the compensation piston 9 is increased along the postponing of the firing time, because the compensation volume belongs to the volume of the combustion chamber, the gas entered into the compensation chamber 8 is temporarily stored in the compensation chamber 8, when piston 2 passes through the top dead point S and begins moving down, the compression degree is decreased and the constant volume degree is decreased, the compensation piston 9 pushed by the compensation cam 11 moves downwards along piston 2, to push out the gas in the compensation chamber 8, to compensate the volume that the piston 2 moving down, the compression degree of the gas in the combustion chamber is not decreased, until ignition burning even though the piston 2 moves down at this time.

Figure 5:
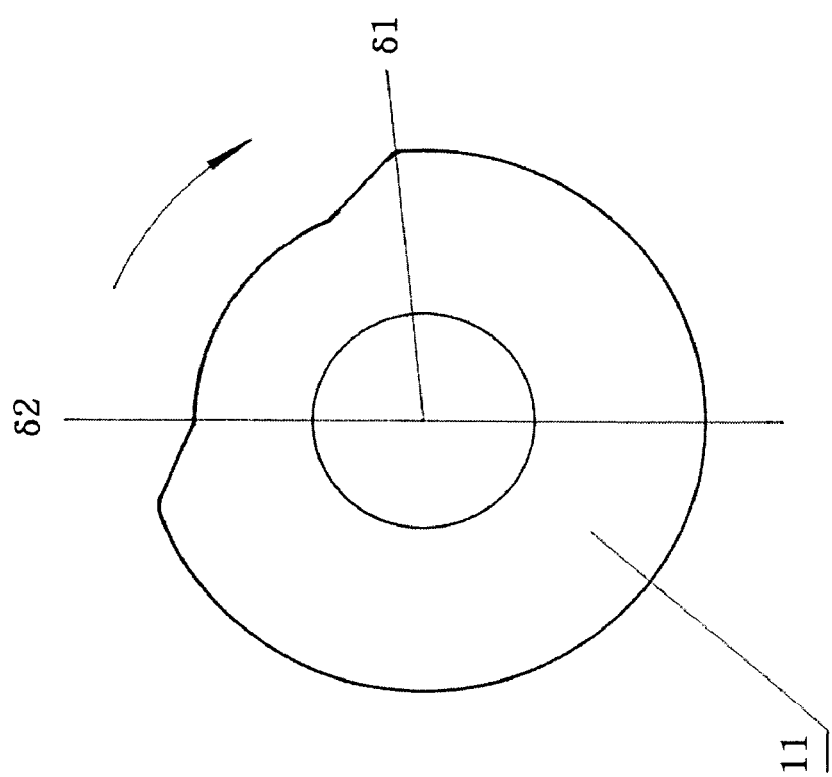
FIG. 5 is the working phase schematic diagram of the compensation cam of the variable compression degree/constant volume level compensating means of the ultra-expansion four-stroke internal combustion engine of the invention.

FIG. 5 is the working phase schematic diagram of the compensation cam of the variable compression degree/constant volume compensation means of the ultra-expansion four-stroke internal combustion engine of the invention. When the ultra-expansion four-stroke internal combustion engine running in an operating condition of middle rotational speed and middle load, the compensation piston 9 is at the highest position; While running in an operating condition of high rotational speed and light load, it is at the lowest position; In an operating condition of the low rotational speed and heavy load, the ignition time is postponed behind the top dead point S, constant volume degree compensation is needed, in the process of the compression of piston 2, the compensation cam 11 is at position δ1 at first, the compensation piston 9 driven by the returning spring 10 begins moving upwards, part of the gas enters into the compensation chamber 8, when the piston 2 reaching the top dead point (i.e. the position δ2 of the compensation cam 11), the compensation piston 9 begins moving down, pushes the gas out of the compensation 8, constant volume degree is compensated.

Figure 6:
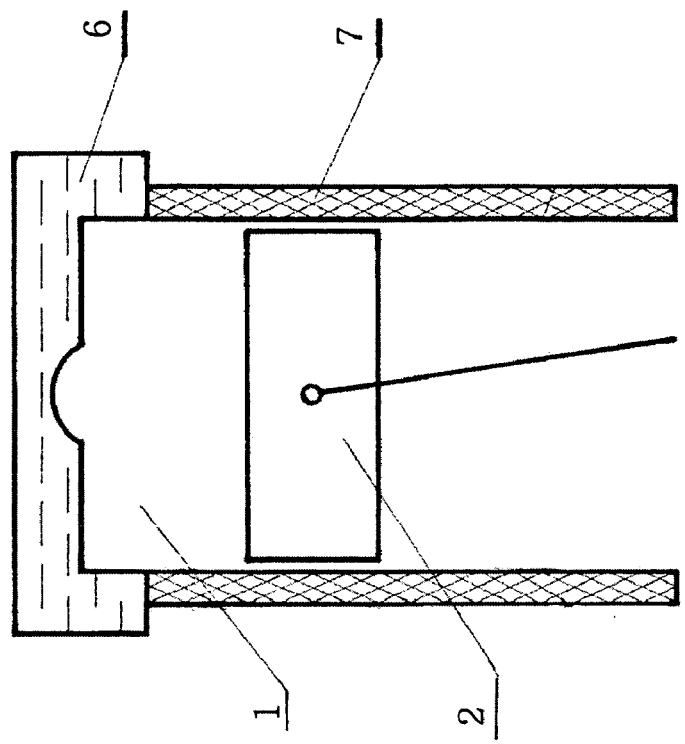
FIG. 6 is the schematic diagram of the distribution of the cooling water jacket and heat-insulating means of the ultra-expansion four-stroke internal combustion engine of the invention.

FIG. 6 is the schematic diagram of the distribution of the cooling water jacket and heat-insulating means of the ultra-expansion four-stroke internal combustion engine of the invention. Few cooling water jacket 6 is mounted on the combustion chamber 5 and the upper part of the cylinder 1, while the lower part of the cylinder 1 is not provided with cooling water jacket, but rather a heat-insulating means 7, the object is to decrease the heat loss in the process of expansion working.

EXAMPLE 2

The admission V2 that satisfies the power requirement of the said cylinder is designed to be 300 ml, the working volume V of the cylinder is designed to be 600 ml, the working volume V is 2 times of the intake volume (is a time of the ultra-expansion working stroke).

1. If the conducted internal combustion engine is spark-ignition internal combustion engine, when the said piston 2 reaches to the top dead point S, the compression degree of the gas is 2 Mpa; the said admission space V2 of the cylinder is 300 ml, the ratio with the volume of the combustion chamber V1 that is to say the theoretical compression ratio is 20:1, then V1 is 300÷20=15 ml.

In this example, the maximum intake flow of the circulation cross-sectional area of the throttle, the intake manifold and intake valve of the spark-ignition combustion engine is admission $V_2$ that satisfies the power requirement, folding angel of the intake and exhaust valve is maintained to sweep the gas; the opening advancing angle α of intake valve 3 is 10°, the closing postponing angle $\beta_1$ of exhaust valve 4 is 12°. Air fuel ratio is tracking controlled by electronic control combustion oil injection system. The closing angle $\alpha_1$ of the intake valve 3 is 15° before the bottom dead point X in the 0°-360° cycle of the crank shaft. The opening angle β of the exhaust valve 4 is 20° before the bottom dead point X in the 360°-720° cycle of the crank shaft, the diameter of the exhaust valve 4 as used is 1.8 times of the diameter of the intake valve 3.

2. If the conducted internal combustion engine is a compression-ignition internal combustion engine, when the said piston 2 reaches the top dead point S, the compression degree of the gas is 3 Mpa; the said admission V2 of the cylinder is 300 ml, the ratio with the volume of the combustion chamber $V_1$ that is to say the theoretical compression ratio is 30:1, then V1 is 300÷34=10 ml.

In this example, the maximum intake flow of the circulation cross-sectional area of the intake manifold and intake valve of the compression-ignition internal combustion engine is admission space $V_2$ that satisfies the power requirement, the quantity of the oil injection is controlled by the oil injection system, the folding angel of the intake and exhaust valve is maintained to sweep the gas; The opening advancing angle α of intake valve 3 is 15°, the closing postponing angle $\beta_1$ of exhaust valve 4 is 18°. The closing angle $\alpha_1$ of the intake valve 3 is 15° before the bottom dead point X in 0°-360° cycle of the crank shaft. The opening angle β of the exhaust valve 4 is 20° before the bottom dead point X in 360°-720° cycle of the crank shaft, the diameter of the exhaust valve 4 as used is 2 times of the diameter of the intake valve 3.

EXAMPLE 3

The intake volume $V_2$ that satisfying the power requirement of the said cylinder is designed to be 300 ml, the working volume V of the cylinder is 900 ml, the working volume V is 3 times of the admission space $V_2$, it is 2 times of the ultra-expansion working stroke.

1. If the conducted internal combustion engine is a spark-ignition internal combustion engine, when the said piston 2 reaches to the top dead point S, the compression degree of the gas is 2 Mpa; the ration of the admission space V2 of the said cylinder and volume of the combustion chamber $V_1$ i.e. the theoretical compression ratio is 20:1, then V1 is 300÷20=15 ml.

In this example, the maximum intake flow of the circulation cross-sectional area of the throttle, the intake manifold and intake valve of the spark-ignition combustion engine is admission space $V_2$ that satisfies the power requirement, the folding angel of the intake and exhaust valve is maintained to sweep the gas; the opening advancing angle α of intake valve 3 is 10°, the closing postponing angle $\beta_1$ of exhaust valve 4 is 12°. Air fuel ratio is tracking controlled by electronic control combustion oil injection system. The closing angle $\alpha_1$ of the intake valve 3 is 15° before the bottom dead point X in the 0°-360° cycle of the crank shaft. The opening angle β of the exhaust valve 4 is 20° before the bottom dead point X in 360°-720° cycle of the crank shaft, the diameter of the exhaust valve 4 as used is 1.8 times of the diameter of the intake valve 3.

2. If the conducted internal combustion engine is a compression-ignition internal combustion engine, when the said piston 2 reaches to the top dead point S, the compression degree of the gas is 3 Mpa; the said admission space V2 of the cylinder is 300 ml, the ratio with the volume of the combustion chamber $V_1$ that is to say the theory compression ratio is 30:1, then V1 is 300÷30=10 ml.

In this example, the maximum intake flow of the circulation cross-sectional area of the intake manifold and intake valve of the compression-ignition internal combustion engine is admission space $V_2$ that satisfies the power requirement, the quantity of the oil injection is controlled by the oil injection system, the folding angel of the intake and exhaust valve is maintained to sweep the gas; The opening advancing angle α of intake valve 3 is 15°, the closing postponing angle $\beta_1$ of exhaust valve 4 is 18°. The closing angle $\alpha_1$ of the intake valve 3 is 15° before the bottom dead point X in 0°-360° cycle of the crank shaft. The opening angle β of the exhaust valve 4 is 20° before the bottom dead point X in 360°-720° cycle of the crank shaft, the diameter of the exhaust valve 4 as used is 2 times of the diameter of the intake valve 3.

In example 2 and 3, a few cooling water jacket is mounted on the combustion chamber 5 and the upper part of the cylinder 1, while the lower part of the cylinder 1 is not provided with a cooling water jacket but rather a heat insulating means 7, the object is to decrease the heat loss in the process of expansion working, to let the combustion engine produce expansion temperature drop in the process of expansion and avoid cooling temperature drop.

In example 2 and 3, the compression degree is greatly increased to produce higher combustion temperature and pressure, the detonation phenomena is avoided by performing postponement of ignition and oil injection, when running in an operating condition of high rotational speed and light load, the ignition or oil injection can be suitably advanced, when running in an operating condition of low rotational speed and heavy load, the ignition or oil injection can be postponed to behind the top dead point, to let the highest combustion temperature and pressure occur behind about 15° of the top dead point, to effectively avoid the detonation phenomenon due to the increase of the compression degree, to eliminate the wild operation. The compression degree can be increased by variable compression degree/constant volume degree level compensating means at operating condition of light load, few intake and low compression degree; the constant volume degree can be compensated at operating condition of heavy load, many intake, high compression degree, the postponement of ignition and oil injection.

Due to the increase of the compression degree and the application of the variable compression degree/constant volume level compensation means, and the combined effect of the heat preservation and heat insulation measure and decrease of the advancing angle of the exhaust, the heat efficiency of the ultra-expansion four-stroke internal combustion engine can reach above 60%. Using the ultra-expansion four-stroke internal combustion engine of the invention: the oil consumption ratio of the spark-ignition internal combustion engine reaches 160 g-190 g (kw h) (the oil consumption ratio of the existing spark-ignition internal combustion engine is 260 g-300 g), the oil consumption ratio of the compression-ignition internal combustion engine reaches 150 g-180 g (kw h) (the oil consumption ratio of the existing compression combustion engine is 200 g-250 g), the heat efficiency is significantly increased, the exhaust temperature and pressure is apparently decreased, the vibration and noise are obviously weaken, the quantity of exhaust is decreased and the quality of exhaust is improved.

The invention claimed is:

1. An ultra-expansion four-stroke internal combustion engine, including a cylinder and a piston, wherein: a compression degree of an admission space that satisfies the power requirement is maintained at 1.8-5 Mpa at the end of the compression stroke to form the condition of increasing combustion temperature and pressure; according to an ultra expansion ratio that can be achieved by the effective working pressure, the working volume of the cylinder is designed to be larger than the admission space, so that the heat energy remaining after constant volume expansion working of the combustion gas may be exploited for further expanding under adiabatic condition to form the ultra-expansion working condition.

2. The ultra-expansion four-stroke internal combustion engine according to claim 1, further comprising a variable compression degree/constant volume level compensation means for keeping the constant volume level and the compression degree not fall when the ignition is postponed, so that the highest combustion temperature and pressure occur in the range of 10°-20° behind the top dead point.

3. The ultra-expansion four-stroke internal combustion engine according to claim 2, wherein said variable compression degree/constant volume level compensation means includes a compensating piston, the said compensating piston can move up and down in the compensated chamber which is communicated with the combustion chamber.

4. The ultra-expansion four-stroke internal combustion engine according to claim 1, further comprising a cooling water jacket mounted on the combustion chamber and the upper part of the cylinder, while the lower part of the cylinder is not provided with a cooling water jacket, but rather a heat insulator.

5. The ultra-expansion four-stroke internal combustion engine according to claim 1, wherein the diameter of exhaust valve is larger than the diameter of the intake valve.

6. The ultra-expansion four-stroke internal combustion engine according to claim 5, wherein the said internal combustion engine is a spark-ignition internal combustion engine, and the compression degree of gas is 1.8-3 Mpa when said piston reaches the top dead point.

7. The ultra-expansion four-stroke internal combustion engine according to claim 6, wherein the closing angle ($\alpha_1$) of its intake valve is 10°-20° before the bottom dead point in the 0°-360° cycle of crank shaft; and the opening angle (β) of its exhaust valve is 15°-25° before the bottom dead point in 360°-720° cycle of crank shaft.

8. The ultra-expansion four-stroke internal combustion engine according to claim 1, wherein the said internal combustion engine is a compression-ignition internal combustion engine, and the compression degree of gas is 3-5 Mpa when the said piston reaches the top dead point.

9. The ultra-expansion four-stroke internal combustion engine according to claim 8, wherein the closing angle ($\alpha_1$) of its intake valve is 10°-20° before the bottom dead point in the 0°-360° cycle of crank shaft; and the opening angle (β) of its exhaust valve is 15°-25° before the bottom dead point in 360°-720° cycle of crank shaft.

* * * * *